United States Patent [19]

Mori et al.

[11] 3,865,181

[45] Feb. 11, 1975

[54] CENTRAL TEMPERATURE CONTROLLING APPARATUS HAVING SEPARATE PRESSURE AND TEMPERATURE CONTROL MEANS

[75] Inventors: Keijiro Mori, Nara-Ken; Masahiro Indo, Nara; Taro Yamamoto, Uji, all of Japan

[73] Assignee: Matsushita Electric Industrial Co., Ltd., Osaka, Japan

[22] Filed: Feb. 21, 1973

[21] Appl. No.: 334,355

[30] Foreign Application Priority Data

Feb. 14, 1973 Japan.................................. 48-18812

[52] U.S. Cl.............. 165/22, 73/398 AR, 165/31, 165/39, 236/1 B, 236/11, 236/78 A
[51] Int. Cl.................................................. F24f 3/00
[58] Field of Search...... 165/31, 22, 39; 73/398 AR; 236/11, 1 B, 78 A

[56] References Cited
UNITED STATES PATENTS

| 2,227,291 | 12/1940 | Wittmann | 236/11 |
| 2,282,210 | 5/1942 | Plum | 165/31 |
| 2,630,505 | 3/1953 | Copping | 236/11 |
| 2,663,498 | 12/1953 | Copping | 236/1 B |
| 3,339,628 | 9/1967 | Sones | 165/39 |
| 3,372,577 | 3/1968 | Bates | 73/398 AR |
| 3,388,597 | 6/1968 | Bargen | 73/398 AR |
| 3,393,566 | 7/1968 | Green | 73/398 AR |
| 3,414,711 | 12/1968 | Guyet | 165/39 |
| 3,482,776 | 12/1969 | Pinckaers | 165/39 |
| 3,543,840 | 12/1970 | Chambers | 165/39 |
| 3,600,950 | 8/1971 | Bergsma | 73/398 AR |
| 3,623,543 | 11/1971 | Ostrander | 165/22 |
| 3,631,921 | 1/1972 | Pedersen | 165/22 |
| 3,653,590 | 4/1972 | Elsea | 236/78 A |

*Primary Examiner*—Manuel A. Antonakas
*Assistant Examiner*—Daniel J. O'Connor
*Attorney, Agent, or Firm*—Stevens, Davis, Miller & Mosher

[57] ABSTRACT

A central temperature controlling apparatus for heating or cooling a plurality of rooms with warm or cool air supplied to the individual rooms through respective ducts, with which temperature adjustment of any room can be done without altering the prevailing warm or cool conditions of the other rooms by appropriately controlling the rate of supply of air from a warm or cool air source and rate of supply or absorption of heat.

8 Claims, 12 Drawing Figures

FIG. I

CENTRAL TEMPERATURE CONTROLLING APPARATUS HAVING SEPARATE PRESSURE AND TEMPERATURE CONTROL MEANS

This invention relates to central temperature controlling apparatus for heating or cooling a plurality of rooms with warm or cool air forced out from a central warm or cool air source by a blower provided therein and led to the individual rooms through respective branch ducts.

The prior-art central heating and cooling apparatus include those in which warm or cool water is led to each of a plurality of rooms for heat exchange therein to thereby effect heating or cooling thereof, and those commonly termed as duct system in which warm or cool air produced in a warm or cool air source is supplied to individual rooms through respective ducts.

The former systems based on the supply of warm or cool water permit temperature control of the individual rooms independently of one another. However, these systems have a drawback in that the plumbing that is required to realize the supply of warm or cool water to individual rooms is somewhat complicated, leading to a high installation cost. Also, in the aspect of maintenance it is very troublesome to cope with the leakage of water. The latter systems, on the other hand, require low installation cost and permit easy maintenance. However, they have had a serious drawback in that it has been impossible to obtain temperataure control of individual rooms independently of one another.

This problem has been inherent in the latter type or duct type prior art central heating and cooling apparatus because of the fact that air delivered to individual rooms, for instance warm air in the case of heating, is sent forth from the same source, for instance a furnace, and led to the individual rooms through respective branch ducts. Insofar as warm air is supplied merely in this way, if warm air supplied to one room is reduced or cut to change the temperature of that room, the rate of supply of warm air to the other rooms would also be affected, resulting in a departure of the temperature of the other rooms from the previous temperature. In other words, although the afore-mentioned duct type prior art system is effective in view of uniformly controlling the temperature of the individual rooms, it cannot permit the temperature control of a particular room without causing any change of the prevailing warm or cool condition of the other rooms. This inevitably accounts for high operating costs and lack of versatility in use.

According to the present invention, the afore-mentioned problem inherent in the prior art duct system is solved through the control of the pressure and temperature of air supplied from a warm or cool air source in response to a change in the rate of supply of warm or cool air to a room in such a manner as to maintain the previous warm or cool conditions of the other rooms.

It is an object of the invention to permit the adjustment of temperature of one or more rooms without affecting the prevailing warm or cool condition of the rest of the rooms by so arranging as to obtain appropriate thermal control, for instance that based on the control of the speed of a blower drive motor and rate of supply of fuel to a burner, in response to the detection of changes in pressure and temperature of air in the warm or cool air source side, the detected changes in air pressure and temperature resulting from the afore-mentioned temperature adjustment in individual rooms.

In the operation of a usual heating or cooling apparatus, for instance four rooms are being warmed, if the supply of warm air to one room is cut, the air that would otherwise be delivered to that room will be theoretically added to the air supplied to the other three rooms. Actually, however, with an increase in the rate of supply of warm air to each of the continually warmed rooms, the ducts leading thereto will offer an increased resistance, so that the total supply of warm air from the warm air source is reduced. Nevertheless, the temperature of the warm air supplied to the continually warmed rooms will be increased provided the rate of supply of heat from a heat source such as a burner remains unchanged. Therefore, the continually warmed rooms will be excessively warmed at an increased rate of supply of warm air at an increased temperature.

In accordance with the invention, if the heating of one of a plurality of rooms is stopped, the total warm air supply rate is reduced by a fraction corresponding to the rate of supply for that room which is no longer warmed. At the same time, the quantity of heat generated from the heat source is reduced in accordance with the extent of reduction of the total rate of supply of warm air. In this way, the temperature of the continually warmed rooms may be held constant.

Another object of the invention is to prevent the generation of noise due to the delivery of excessive warm or cool air and realize quiet room heating or cooling.

A further object of the invention is to permit precise control of the speed of a blower drive motor and hence precise control of the air supply rate by amplifying the result of detection of the pressure of the supplied air through an electronic circuit.

A still further object of the invention is to further enhance the precision of the afore-mentioned air supply rate control by detecting the air pressure with a semiconductor detector, which is susceptible to an even very slight change of the air pressure.

A yet further object of the invention is to permit simple and reliable control of the blower through an electronic circuit including two strain-sensitive resistive elements serving to detect the air pressure and connected in series in a bridge.

The above and other objects, features and advantages of the invention will become more apparent from the following detailed description when read in connection with the accompanying drawings, in which.

Figure 1:
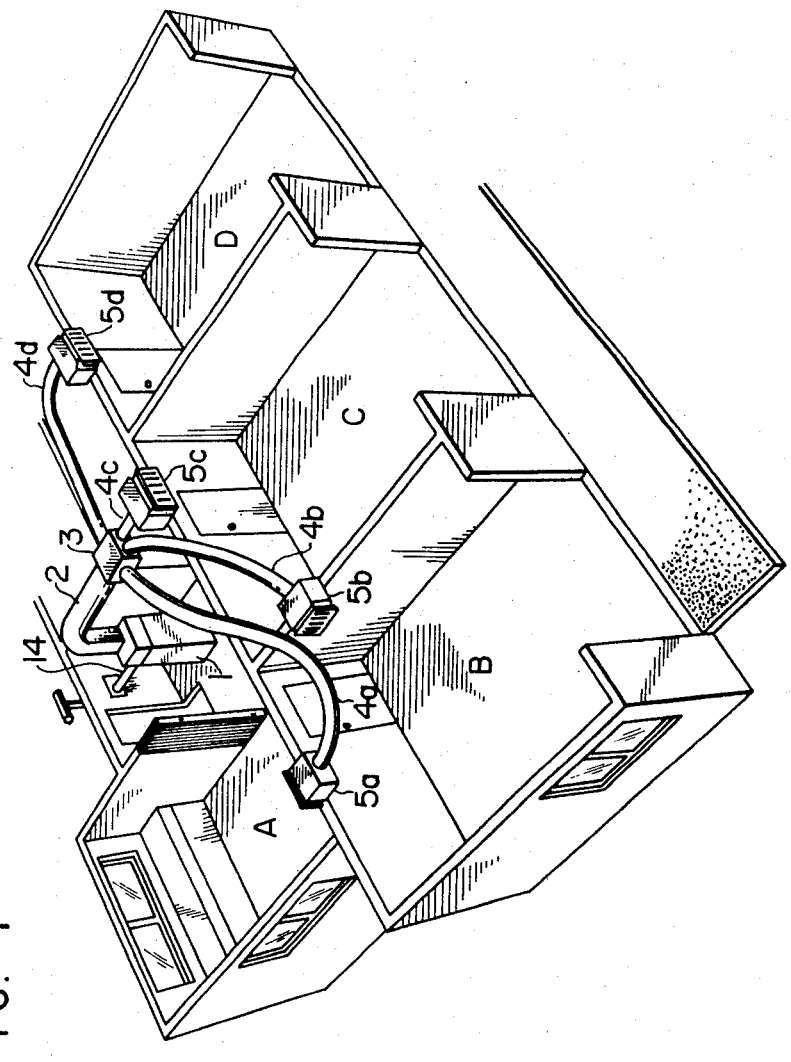
FIG. 1 is a perspective view showing the whole arrangement of a central heating (and/or cooling) apparatus, according to the invention.

FIG. 1 shows a central heating apparatus. In the Figure, reference numeral 1 designates a warm air source. A main duct 2 extends from the top of the source 1 and is connected at its downstream end to a distributor 3. A plurality of branch ducts extend from the distributor 3 and are respectively provided at their downstream ends with air outlets 5a, 5b, 5c and 5d open to respective rooms A, B, C and D to be warmed.

Figure 2:
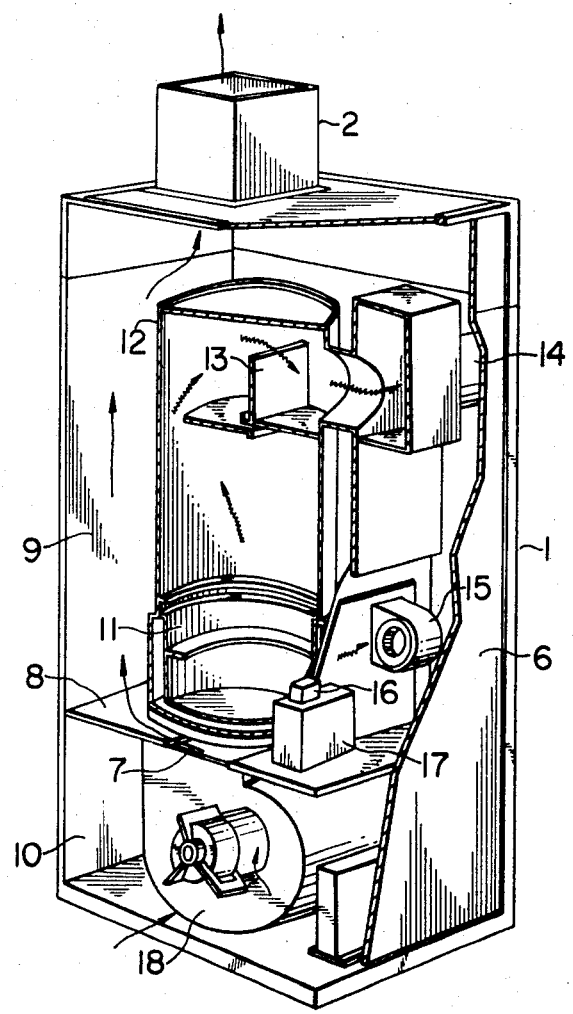
FIG. 2 is a perspective view, partly broken away, showing an example of the well-known warm air source.

FIG. 2 shows a typical construction of the warm air source 1. It comprises a housing 6, from whose top the main duct 2 extends. The interior of the housing 6 is divided by a separator 8 formed with an air passage slit 7 into two sections 9 and 10. Within the section 9 a burner 11 and a heat exchanger 12 coupled therewith are accommodated. The combustion gas from the burner 11 rises while heating the heat exchanger 12, and then it flows past a baffle 13 into an exhaust pipe 14, and thence to the outside. Numeral 15 designates a burner fan motor, and numeral 17 a burner control unit including an electromagnetic fuel valve 16 for controlling the rate of fuel supply to the burner 11. Provided within the section 9 is a blower drive means such as a fan motor 18. With this means the return air from the warmed rooms is withdrawn and recirculated through the air passage slit 7 into the section 9. The air forced into the section 9 is warmed as it rises past the heat exchanger 12 before it is sent out through the main duct 2. The warm air forced through the main duct 2 enters the distributor 3, whence it flows through the branch ducts 4a, 4b, 4c and 4d and is discharged at the warm air outlets 5a, 5b, 5c and 5d to warm the associated rooms A, B, C and D.

Figure 3:
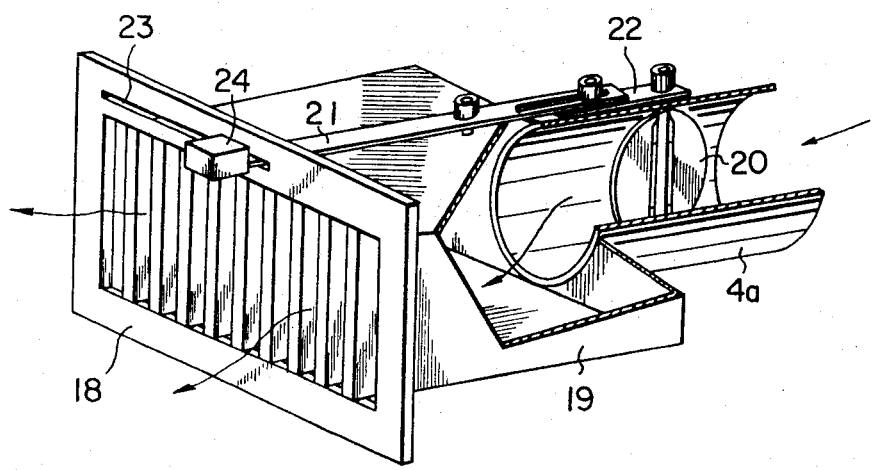
FIG. 3 is a perspective view, partly broken away, showing a well-known warm or cool air outlet provided in a room.

FIG. 3 shows an example of the warm air outlet. It uses a louver 18 mounted on the front side of a casing 19, whose rear side communicates with the associated branch duct. Also, a damper 20 is provided within the branch duct near the downstream end thereof. It is provided to enable the adjustment of the aperture of the branch duct by rotating it by means of levers 21 and 22 and thereby regulate the rate of supply of air to the room. One of the levers, namely lever 21, extends through a horizontal channel or slit formed in the frame of the louver 18 and is provided at its free end with a knob 24. With this construction, the aperture of the duct 4a may be varied through the damper 20. When the aperture is reduced, the temperature of the room A is reduced. When the duct 4a is completely closed, the heating of the room A is stopped. Of course this construction may be employed in the warm air outlet for the other rooms B, C and D as well.

Figure 4:
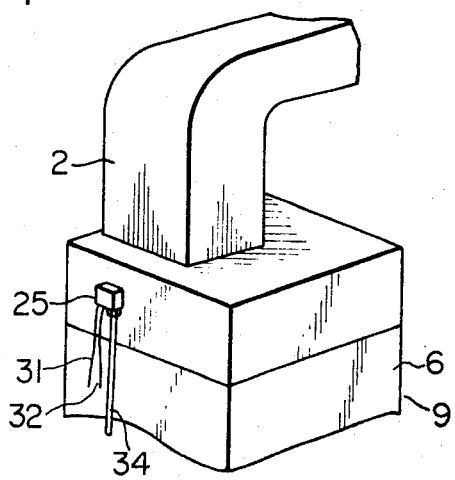
FIG. 4 is a fragmentary perspective view showing a warm air temperature and pressure detecting section provided in the warm air source.
Figure 5:
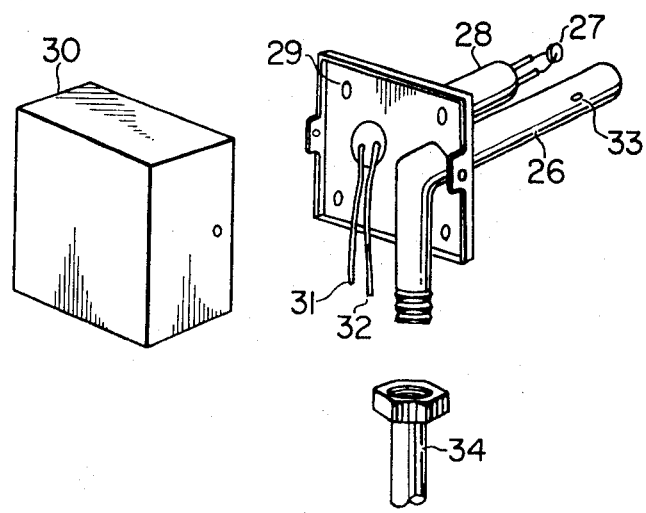
FIG. 5 is an exploded perspective view, partly broken away, showing parts of the detecting section shown in FIG. 4.

FIGS. 4 and 5 show a detector 25 to detect the pressure and temperature of supply air. In the illustrated example, it is provided on the top of the housing 6 of the warm air source 1, but it may be provided at any position along the warm air path before the branch ducts 4a, 4b, 4c and 4d. It includes an air pressure detector pipe 26 mounted in a chassis 29 and extending into an upper portion of the section 9. It also includes a negative coefficient thermistor 27 carried by a support bar 28 also mounted in the chassis 29. Numeral 30 designates a cover attached to the chassis 29, numerals 31 and 32 leads leading from the thermistor 27, numeral 33 a pressure introduction hole formed in the wall of the air pressure detector pipe 26, and numeral 34 a pressure lead-in pipe connected to the air pressure detector pipe 26 and communicating with a pressure leading path to be described hereinafter.

Figure 6:
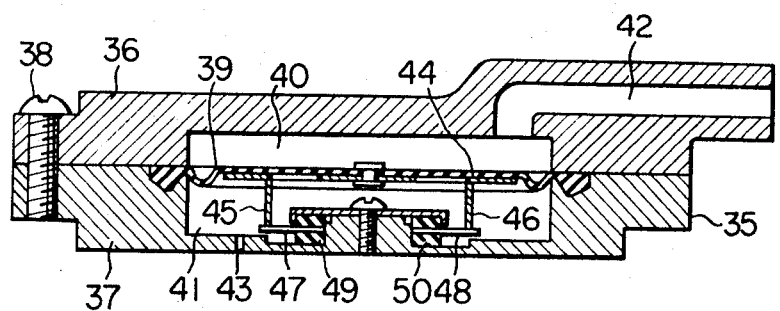
FIG. 6 is a sectional view showing a pressure detector.
Figure 7:
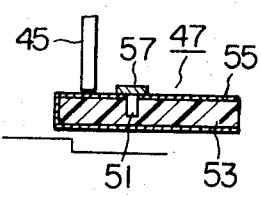
FIGS. 7 and 8 are sectional views of strain-sensitive resistive means employed in the pressure detector of FIG. 6.
Figure 8:
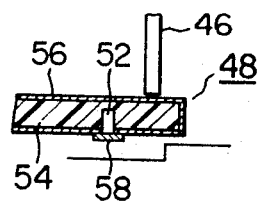

FIG. 6 shows an air pressure detector generally indicated at 35. It comprises members 36 and 37 secured to each other by a bolt 38 and defining an enclosed inner space, which is divided by a diaphragm 39 of an elastic material such as rubber into two chambers or sections 40 and 41. The section 40 communicates with a pressure lead-in path 42 communicating with the afore-mentioned pressure lead-in pipe 34. In the wall defining the other section 41 an air path 43 is provided. A plate 44 is fixed to the side of the diaphragm 39 defining the section 41 and is provided with perpendicular projections 45 and 46, whose free ends are in contact with respective strain-sensitive resistive means 47 and 48. These means 47 and 48 are secured at their one end to the bottom wall of the chamber 41 via insulating members 49 and 50 of rubber or like material, and the top of their free end portion engages with the associated one of the projections 45 and 46. As shown in FIGS. 7 and 8, they each comprises an insulating body 53 or 54 of a synthetic resin and formed with a notch 51 or 52, a conducting layer 55 or 56 of such metal as copper applied over the upper, lower and free end surface of the body 53 or 54 except for the notch 51 or 52 and a strain-sensitive resistive element 57 or 58 secured to the insulating body 53 or 54 via the metal layer 55 or 56 and bridging the notch 51 and 52. The elements 57 and 58 have such a character that their electric resistance changes when a strain is produced in them. The strain-sensitive resistive means 47 and 48 are secured in an opposite relation to each other. More particularly, when the strain-sensitive resistive means 47 is pushed by the projection 45, it is deformed in such a way that its material is displaced away from the notch 51 to increase the gap thereof and exert a tensile force on the element 57. On the other hand, the other strain-sensitive resistive means 48 is adapted to deform in such a way to reduced the gap of the notch 52 and exert a compressive force on the element 58. Thus, it will be seen that when the diaphragm 39 is displaced, the same magnitude of force is transferred to the strain-sensitive resistive means 47 and 48 by the respective projections 45 and 46, but the elements 57 and 58 are stressed in opposite directions. Assuming the load exerted on the element 57 to be positive and that exerted on the element 58 negative, the resistance of these elements varies as shown in FIG. 9.

Figure 9:
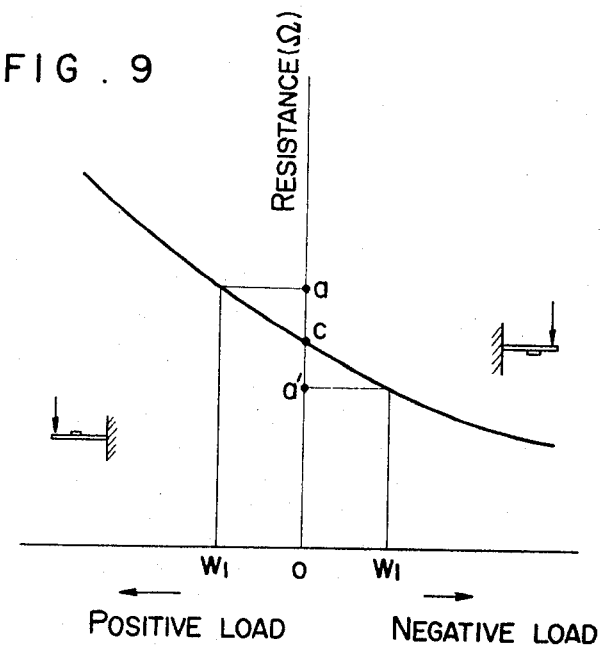
FIG. 9 shows a characteristic of strain sensitive resistive elements attached in the manner shown in FIG. 6.

As is shown in FIG. 9 when the load is zero, both the elements 57 and 58 offer a resistance of the same value C. When they are stressed with a load $W_1$, however, the resistance of the element 57 is increased to a value $a$, while that of the element 58 is descreased to a value $a'$. In this way, the resistances of the strain-sensitive resistive means 47 and 48 change in an opposite relation to each other.

In the operation of the arrangement described so far, with burner 11 and fan motor 18 operated, air sent forth by the fan motor 18 is warmed as it proceeds in contact with the heat exchanger 12 heated by the burner 11. The warm air thus produced within the housing 6 flows through the main duct 2 into the distributor 3, whence it flows through the branch ducts 4a, 4b, 4c and 4d and is discharged at the warm air outlets 5a, 5b, 5c and 5d for warming the rooms A, B, C and D. At each warm air outlet, by horizontally moving the knob 24 (FIG. 3) the damper 20 may be turned to vary the aperture of the branch duct. For instance, if it is intended to stop the warming of the room A or reduce the temperature thereof, the damper 20 is turned to the "off" position or to a position to reduce the aperture of the branch duct 4a. When this is done so, the warm air that was deemed to be supplied to the room A turns to go into the other branch ducts 4b, 4c and 4d. As a result, the speed of flow of warm air through the branch ducts 4b, 4c and 4d is increased to increase the resistance against the air flow. Due to this increase, the pressure in the warm air path upstream of the branch ducts is increased. The increased pressure is transmitted through the pressure introduction hole 33 in the pressure detector pipe 26, pressure lead-in pipe 34 and pressure lead-in path 42 in the pressure detector 35 to the chamber 40 therein, thus downwardly displacing the diaphragm 39 shown in FIG. 6. Since the plate 44 is displaced together with the diaphragm 39, the strain-sensitive resistive means 47 is given a positive load by the projection 45, while the other strain-sensitive resistive means 48 is given a negative load by the projection 46, so that their resistance changes as shown in FIG. 9. In response to this change of resistance a pressure control circuit 59 shown in FIG. 10 acts to reduce the speed of the fan motor 18. In this way, the total warm air supply rate is reduced by an amount corresponding to the rate of the previous warm air flow through the branch duct 4a. Thus, the flow speed or flow rate of warm air through the branch ducts 4b, 4c and 4c may held unchanged. Meanwhile, with the reduction of the speed of the fam motor 18, the quantity of air sent forth past the heat exchanger 12 is reduced, so that the temperature of the warm air tends to increase. This temperature rise is detected by a thermistor 27 shown in FIG. 10, and in response to the detection result a temperature control circuit 60 acts to reduce the supply of fuel from fuel valve 16 to burner 11 so as to reduce the quantity of generated heat. Thus, even if the rate of supply of air from the fan motor 18 is reduced, the temperature of the warm air may be held substantially unchanged.

It will be appreciated that the rate of supply of warm air to the room A may be varied while maintaining the supply of warm air at a constant rate and at a constant temperature to the other rooms B, C and D. In other words, the heating condition for the room A may be changed without affecting the heating of the other rooms B, C and D.

It is thus possible with the apparatus described in the foregoing to obtain room-by-room control of the room warming.

While the foregoing example has concerned with the production of warm air with the heat of combustion of a fuel such as petroleum or gas fuel burnt in the burner 11, the same effects may be obtained in the case of using an electric heater as the heat source as well. Further, room cooling with cool air may be obtained by using a cooler in place of the heat exchanger. In this case, the control of the cool air temperature may be done by controlling the rate of supply of a cooling medium.

Furthermore, while in the above example the air pressure and temperature detector 25 is provided on the top of the casing 6, it may as well be provided in the main duct 2 or distributor 3. In general, it may be provided at any location inasmuch as it can commonly detect pressure and temperature changes resulting from an aperture adjustment of whichever branch duct.

Figure 10:
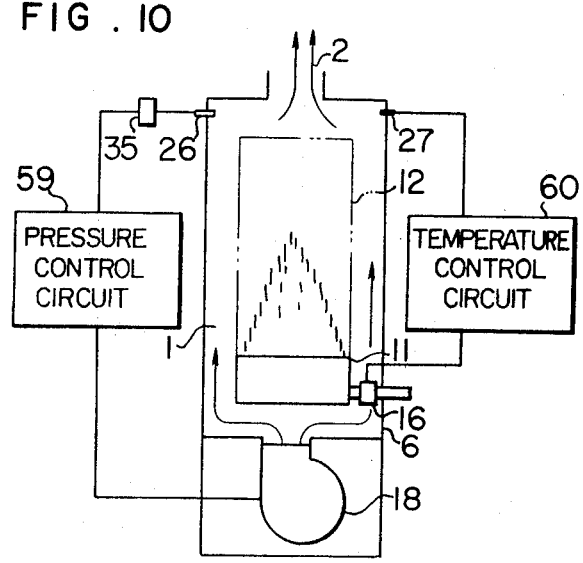
FIG. 10 is a schematic view showing the basic arrangement for the room-by-room temperature control according to the invention.
Figure 11:
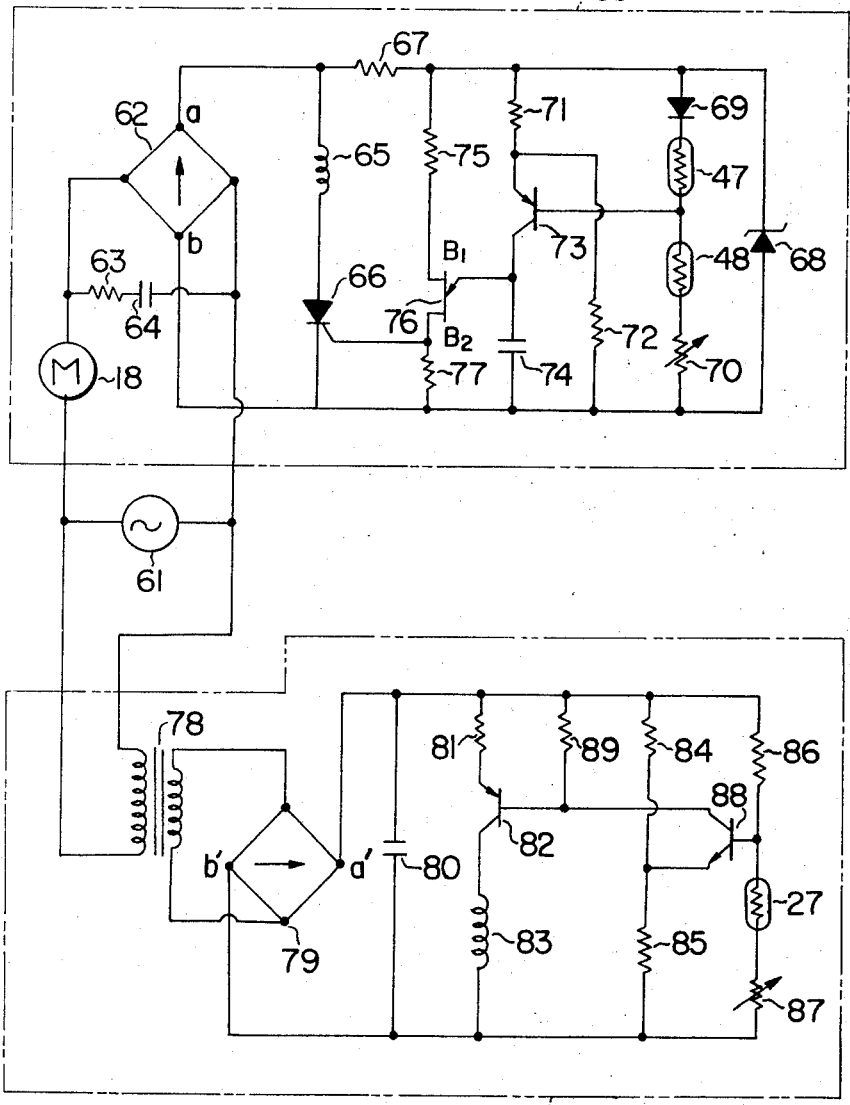
FIG. 11 is a schematic view of an electric circuit for controlling air supply rate and air temperature.

FIG. 11 shows a specific example of the combination of pressure control circuit 59 and temperature control circuit 60 shown in FIG. 10.

The pressure control circuit 59 will first be described. Numeral 18 designates the fan motor, which is connected in series with a diode bridge 62 across an a-c power source 61. A series circuit of resistor 63 and capacitor 64 is connected between a pair of diagonal d-c terminals of the diode bridge 62. Connected between the other pair of diagonal d-c terminals $a$ and $b$ of the diode bridge 62 is a series circuit of an inductor 65 and a silicon controlled rectifier 66 (hereinafter referred to as SCR). The terminal $a$ of the diode bridge 62 is also connected to a resistor 67, which is in turn connected to the positive terminal of a Zener diode 68, whose negative terminal is in turn connected to the terminal $b$ of the diode bridge 62. A series circuit consisting of a diode 69, strain-sensitive resistive elements 47 and 48 and a variable resistor 70 connected in the mentioned order and another series circuit consisting of resistors 71 and 72 are connected in parallel with the Zener diode 68. The junction between the resistors 71 and 72 and the junction between the strain-sensitive resistive elements 47 and 48 serve as pressure signal detection terminals. The resistor 72 is in parallel with a series circuit consisting of the emittercollector path of a transistor 73 and a capacitor 74. The base of the transistor 73 is connected to the junction between the strain-sensitive resistive elements 47 and 48. Connected also in parallel with the Zener diode 68 is a further series circuit consisting of a resistor 75, the path between bases $B_1$ and $B_2$ of a unijunction transistor 76 and a resistor 77 connected in the mentioned order. The unijunction transistor 76 has its base $B_2$ connected to the gate of the SCR 66 and its emitter connected to the junction between the emitter of the transistor 73 and capacitor 74.

The strain-sensitive resistive elements 47 and 48 are included in the pressure detector 35 as mentioned earlier in connection with FIG. 6. The resistance of the element 47 is adapted to be increased while that of the element 48 is adapted to be reduced when a pressure increase is sensed by the pressure detector 35. The voltage of the power source 61 is coupled to the fan motor 18 when the SCR 66 is "on," while it is not when the SCR 66 is "off." Accordingly, the effective value of the voltage coupled to the fan motor 18 may be controlled to control the speed thereof by controlling the firing angle of the SCR 66. The air pressure may be set to a desired value by appropriately setting the variable resistor 70.

The transistor 73 is triggered by a pressure signal appearing between the pressure signal detection terminals to cause a current according to the pressure signal, thereby charging the capacitor 74. The terminal voltage across the capacitor 74, and hence the emitter potential on the unijunction transistor 76, increases until the firing potential thereof is reached, whereupon the resistance between emitter and base $B_2$ of the unijunction transistor 76 is suddenly reduced to cause the discharging of the capacitor through parallel discharging circuits of the gate cathode path of the SCR 66 and resistor 77, thus firing the SCR 66. When this situation sets in, the source voltage is supplied to the fan motor 18. Accordingly, if the detected pressure becomes higher than the preset pressure with an increase of the supply air pressure, the resistance of the strain-sensitive resistive element 47 is increased while that of the strain-sensitive resistive element 48 is reduced, so that the current through the transistor 73, and hence the charging current flowing into the capacitor 74, is reduced. As a result, the time until the reaching of the firing potential of the unijunction transistor 76 is extended. This means an increase of the firing angle of the SCR 66, so that the effective voltage coupled to the fan motor 18 is reduced to reduce the speed thereof. In this way, an increase of the supply air pressure can be suppressed. In the case when the supply air pressure is reduced, this electronic circuit also functions to recover the preset pressure. Thus the supply air pressure may be held constant even if the air supply rate changes. The diode 69 serves the role of temperature compensation, the inductor 65 and capacitor 64 are provided to eliminate noise voltage, and the resistor 63 is provided to prevent rush current.

The temperature control circuit 60 will now be described. Numeral 78 designates a transformer, whose primary coil is connected across the power source 61, and whose secondary coil is connected between a pair of diagonal a-c terminals of a diode bridge 79. A capacitor 80, a series circuit consisting of a resistor 81, the emitter-collector path of a transistor 82 and an electromagnetic coil 83 of the electromagnetic fuel valve 16, another series circuit consisting of resistoros 84 and 85 and a further series circuit consisting of a resistor 86, a thermistor 27 and a variable resistor 87 are connected in parallel between a pair of diagonal d-c terminals $a'$ and $b'$ of the diode bridge 79. The junction between resistors 84 and 85 and the junction between resistor 86 and thermistor 27 serve as temperature signal detection terminals and are respectively connected to the emitter and base of a transistor 88, whose collector is connected to the base of the transistor 82. A further resistor 89 is connected between the terminal $a$ of the diode bridge 79 and the base of the transistor 82. The electromagnetic coil 83 is the drive coil for the electromagnetic fuel valve shown in FIG. 2.

The transformer 78 converts a 100-volt a-c source voltage into 24-volt a-c voltage, which is in turn converted into a d-c voltage through the diode bridge 79 and capacitor 80. The variable resistor 87, the series circuit of thermistor 27 and resistor 86, the resistor 84 and the resistor 85 constitute respective four sides of a supply air temperature detection bridge. The thermistor 27 has a negative coefficient characteristic; its resistance increases with increase of its temperature. Thus, when the temperature of the supply air is increased, the resistance of the thermistor 27 is increased with the rise of the temperature thereof. As a result, the base potential on the transistor 88 is increased to increase the collector current therein. Since this current flows into the base of the transistor 82, the collector current therein is also increased. Since the electromagnetic coil 83 of the fuel valve 16 (FIG. 2) is energized by the collector current from the transistor 82, the fuel valve 16 is activated with increase of the supply air temperature. When the fuel valve 16 is activated the rate of supply of fuel such as petroleum or gas fuel to the burner 11 is reduced, so that the rate of combustion in the burner 11 is reduced. With a decrease in the combustion rate the transfer of heat to and the temperature of the supply air is lowered to reduce the resistance of the thermistor 27, so that the base potential on the transistor 88 is lowered toward the cut-off level. As a result, the collector current in the transistor 82, i.e., current through the coil 83, is reduced. There is a hysteresis in the fuel valve 16; the current level for recovering the initial condition is lower than the current level for causing the action of it. Therefore, the temperature at which the rate of fuel supply begins to increase is lower than the temperature at which the fuel supply rate begins to decrease.

Figure 12:
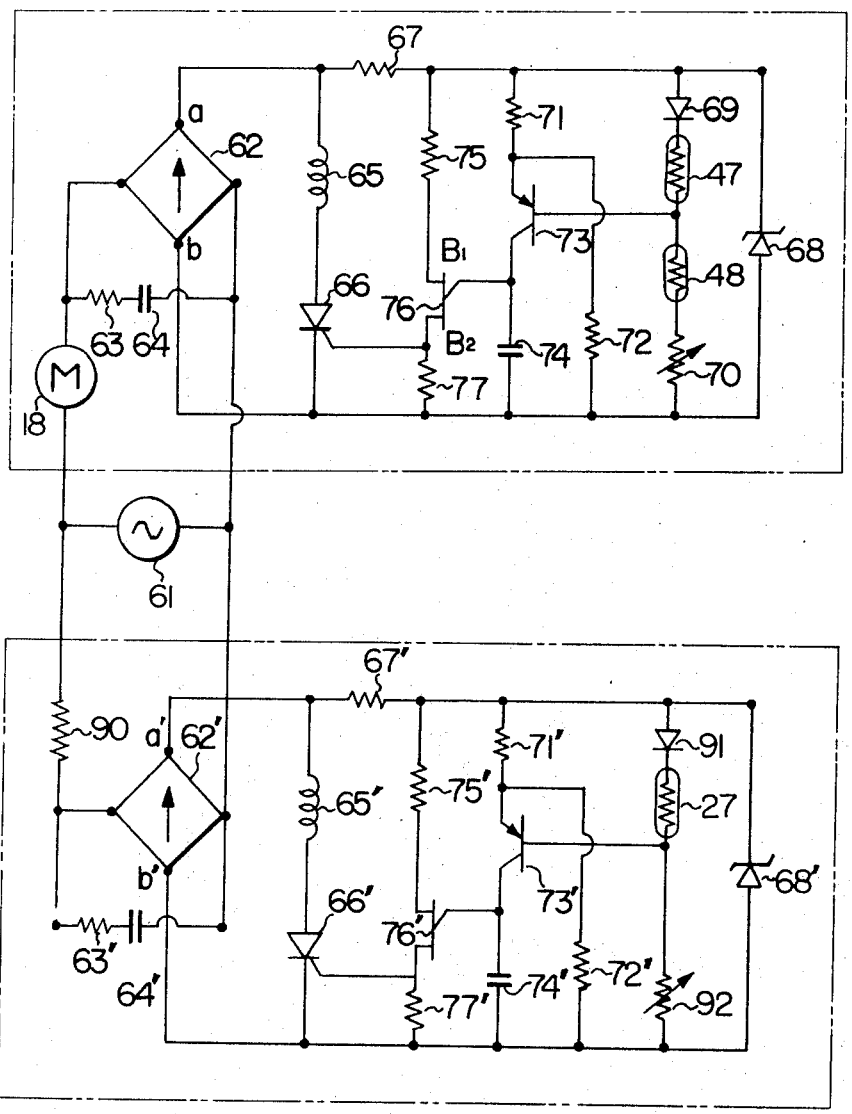
FIG. 12 is a schematic view showing a different example of the electronic circuit for the air supply and air temperature control.

FIG. 12 shows another example of the pressure and temperature control circuitry, which is applied to the case of using an electric heater 90 in place of a burner as the heat source. In this example, the pressure control circuit is entirely the same as 59 in the preceding example, and the fan motor current control means in this circuit is directly applied to the temperature control circuit. More particularly, the temperature control circuit is constructed by replacing the series circuit of diode 69, strain-sensitive resistive elements 47 and 48 and variable resistor 70 in the circuit 59 with a series circuit consisting of a diode 91, a thermistor 27 and a variable resistor 92 and connecting the junction between thermistor 27 and variable resistor 92 to the base of the transistor 73. In this example, when the resistance of the thermistor 27 is increased with increase in the supply air temperature, the current flowing into the electric heater 90 is reduced, thus reducing the rate of heat generation.

While the preceding examples are concerned with room heating, in the case of room cooling the coil 83 in the FIG. 11 example may be used as the drive coil for a cooling medium supply control valve.

As has been described in the foregoing, it is possible to provide a duct type central heating and/or cooling system, which permits room-by-room temperature adjustment of individual rooms by controlling the speed of the blower drive means and the rate of heat generation from the heat source on the basis of the detection of pressure and temperature of air in the main air duct.

What we claim is:

1. A central temperature controlling apparatus comprising:
    a blower;
    heat exchanger means for modifying the temperature of air supplied by said blower;
    a plurality of branch ducts leading the air supplied by said blower to respectively associated individual rooms;
    means for regulating the rate of supply of air to each of said individual rooms;
    pressure control means to control the pressure of supply air from said blower in accordance with the pressure of said air in a common path upstream of said branch ducts; and temperature control means to control the transfer of heat between the air supplied by said blower and said heat exchanger in accordance with the temperature of said air in said common path.

2. A central temperature controlling apparatus according to claim 1, wherein said blower comprises a fan and a fan drive motor.

3. A central temperature controlling apparatus according to claim 2, wherein said pressure control means includes a pressure detector to detect the pressure of the air in the common path, and an electronic circuit having an amplifier to amplify the detection signal from said pressure detector and means to control the speed of said fan drive motor so as to vary the rate of air supply in accordance with the amplified detection signal.

4. A central temperature controlling apparatus according to claim 3, wherein said pressure detector includes semiconductor pressure detecting means.

5. A central temperature controlling apparatus according to claim 2, wherein said pressure control means includes an electronic circuit for controlling the speed of said fan drive motor, said electronic circuit including a bridge having two series sides consisting of respective strain-sensitive resistive elements, said strain-sensitive resistive elements having opposite strain-resistance characteristics to each other and serving the role of detecting the pressure of the air in the common path.

6. A central temperature controlling apparatus according to claim 2, wherein said pressure control means includes a pressure detector to detect the pressure of the air in the common path, and means for phase controlling the voltage supplied to said fan drive motor to thereby control the speed of said fan drive motor so as to vary the rate of air supply in accordance with the detection signal from said pressure detector.

7. A central temperature controlling apparatus according to claim 2, wherein said temperature control means includes a heat-sensitive resistive element to detect the temperatures of the air in the common path, a semiconductor amplifier to amplify the detection signal from said heat-sensitive resistive element and means to control the transfer of heat between the air supplied by said blower and said heat exchanger in accordance with the amplified detection signal.

8. A central temperature controlling apparatus according to claim 3, wherein said pressure detector includes a diaphragm sensitive to the pressure of the air in said common path, a pair of members capable of following the displacement of said diaphragm and a pair of strain-sensitive resistive means adapted to be stressed in opposite directions by said respective members.

* * * * *